United States Patent
Garg et al.

(10) Patent No.: US 11,462,120 B2
(45) Date of Patent: Oct. 4, 2022

(54) METHOD AND SYSTEM FOR CONDUCTING EXAMINATIONS OVER BLOCKCHAIN

(71) Applicant: MASTERCARD INTERNATIONAL INCORPORATED, Purchase, NY (US)

(72) Inventors: Chandan Garg, Punjab (IN); Jaipal Singh Kumawat, Rajasthan (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 930 days.

(21) Appl. No.: 16/164,885

(22) Filed: Oct. 19, 2018

(65) Prior Publication Data

US 2020/0126441 A1 Apr. 23, 2020

(51) Int. Cl.
| | |
|---|---|
| *H04L 9/32* | (2006.01) |
| *H04L 9/30* | (2006.01) |
| *G09B 7/10* | (2006.01) |
| *H04L 9/06* | (2006.01) |
| *H04L 9/00* | (2022.01) |

(52) U.S. Cl.
CPC .......... *G09B 7/10* (2013.01); *H04L 9/30* (2013.01); *H04L 9/3247* (2013.01); *H04L 9/0643* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 2004/0229199 | A1* | 11/2004 | Ashley | G09B 7/00 434/323 |
| 2015/0248841 | A1* | 9/2015 | Peterson | G09B 7/07 434/350 |
| 2019/0068360 | A1* | 2/2019 | Bhattacharya | H04L 9/3239 |

(Continued)

OTHER PUBLICATIONS

Shen et al., Research on Online Quiz Scheme Based on Double-layer Consortium Blockchain, 2018 9th International Conference on Information Technology in Medicine and Education, pp. 956-960 (Year: 2018).*

(Continued)

*Primary Examiner* — Luu T Pham
*Assistant Examiner* — Edward X Long
(74) *Attorney, Agent, or Firm* — Panitch Schwarze Belisario & Nadel LLP

(57) ABSTRACT

A method for examination scoring via blockchain includes: receiving, by a receiver of a processing server, an answer submission from an external computing device, wherein the answer submission includes at least one digital signature and a plurality of exam answers; validating, by a processing device of the processing server, the digital signature using a public key of a cryptographic key pair; determining, for each of the plurality of exam answers, if the respective exam answer is correct or incorrect based on an answer key; generating, for each correct exam answer, a blockchain data value, wherein the blockchain data value includes at least the validated digital signature; transmitting, by a transmitter of the processing server, the generated blockchain data values (Continued)

to one or more nodes in a blockchain network for validation and addition to a blockchain associated with the blockchain network.

14 Claims, 5 Drawing Sheets

(56) References Cited

U.S. PATENT DOCUMENTS

| | | | |
|---|---|---|---|
| 2019/0139431 A1* | 5/2019 | Gordon | G09B 5/00 |
| 2019/0295202 A1* | 9/2019 | Mankovskii | H04L 9/3239 |
| 2020/0250676 A1* | 8/2020 | Sierra | H04L 9/3239 |

OTHER PUBLICATIONS

Castella-Roca et al., A Secure E-Exam Management System, Proceedings of the First International Conference on Availability, Reliability and Security (ARES'06), 2006 (Year: 2006).*

* cited by examiner

METHOD AND SYSTEM FOR CONDUCTING EXAMINATIONS OVER BLOCKCHAIN

FIELD

The present disclosure relates to the conducting of examinations over a blockchain, specifically the use of a blockchain to track answers for an examination to provide for accurate and auditable scoring with full transparency.

BACKGROUND

Traditionally, examinations, including student examinations, entrance exams, aptitude tests, employee evaluations, etc., are conducted in a very closed process with scoring being done either manually or through scanning machines that have significant error rates. In an effort to streamline the process and lessen the possibility for error, many exams are conducted electronically, such as through a computer. Examinations done on a computer will often have answers scored immediately and with less error than in non-electronic methods.

However, the lack of transparency in the administration and scoring of electronic exams can be problematic. For instance, a test taker may be insistent that they did not answer in a manner suggested by the administering system, or may disagree with the score provided. If the system is not configured to make the detailed scoring information available, there may be no feasible way to resolve the dispute in a manner that is satisfactory to the test taker. In cases where detailed scoring information is available, because the system is a closed system, there is a risk that the data has been tampered with or otherwise compromised.

Thus, there is a need for an electronic examination system where there is complete transparency with respect to scoring of the examination, where there is also an inability for the scores to be tampered with.

SUMMARY

The present disclosure provides a description of systems and methods for examination scoring via blockchain. When an electronic exam is administered, answers submitted by a test taker are provided along with a digital signature generated via a blockchain wallet unique to that test taker. The digital signature is validated to ensure that it is the proper test taker, and the answers immediately scored and the results stored on a blockchain. In an exemplary embodiment, each correct answer is added as a separate entry on the blockchain. The overall score can then be easily calculated via the number of entries on the blockchain for that test taker and test. The use of a blockchain prevents any tampering due to the immutable nature of the blockchain, while at the same time providing complete transparency as to the results of the test; the results are undisputed. The blockchain can also be extended to store test results, negative answers, and/or the test itself to further increase the protections and transparency of the examination process.

A method for examination scoring via blockchain includes: receiving, by a receiver of a processing server, an answer submission from an external computing device, wherein the answer submission includes at least one digital signature and a plurality of exam answers; validating, by a processing device of the processing server, the digital signature using a public key of a cryptographic key pair; determining, for each of the plurality of exam answers, if the respective exam answer is correct or incorrect based on an answer key; generating, for each correct exam answer, a blockchain data value, wherein the blockchain data value includes at least the validated digital signature; transmitting, by a transmitter of the processing server, the generated blockchain data values to one or more nodes in a blockchain network for validation and addition to a blockchain associated with the blockchain network.

A system for examination scoring via blockchain includes: a receiver of a processing server configured to receive an answer submission from an external computing device, wherein the answer submission includes at least one digital signature and a plurality of exam answers; a processing device of the processing server configured to validate the digital signature using a public key of a cryptographic key pair, determine, for each of the plurality of exam answers, if the respective exam answer is correct or incorrect based on an answer key, and generate, for each correct exam answer, a blockchain data value, wherein the blockchain data value includes at least the validated digital signature; and a transmitter of the processing server configured to transmit the generated blockchain data values to one or more nodes in a blockchain network for validation and addition to a blockchain associated with the blockchain network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Examination Scoring via Blockchain

Figure 1:
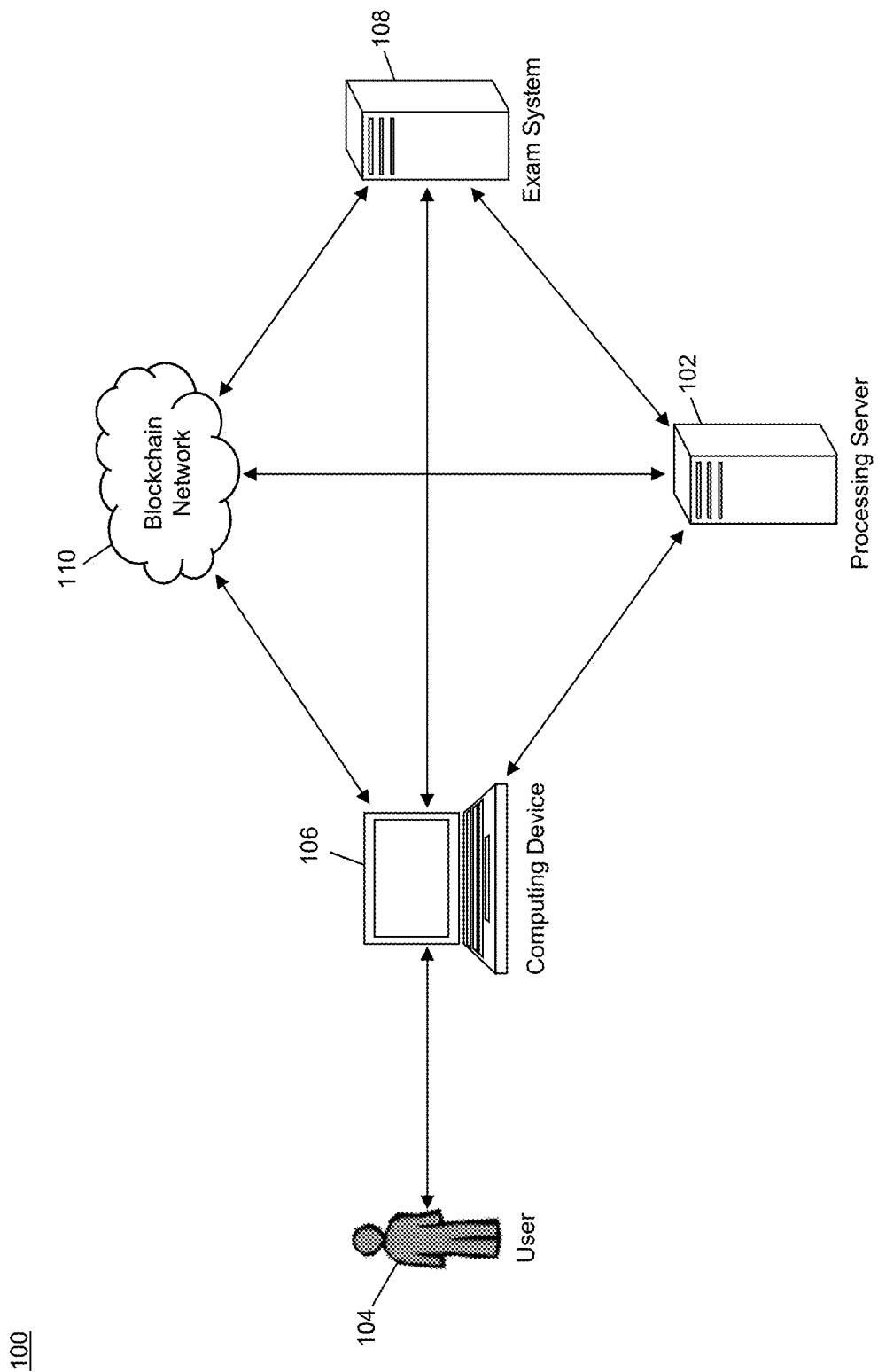
FIG. 1 is a block diagram illustrating a high level system architecture for examination scoring via blockchain in accordance with exemplary embodiments.

FIG. 1 illustrates a system 100 for the administration and scoring of an electronic examination that is assisted via the use of a blockchain.

The system 100 may include a processing server 102. The processing server 102, discussed in more detail below, may be configured to assist in the scoring, and in some cases the administration, of an electronic exam taken by a user 104. In the system 100, an electronic exam may be administered to the user 104 via a computing device 106 operated thereby. The computing device 106 may be any type of device suitable for taking an electronic exam and submitting answers therefrom, such as a specifically configured desktop computer, laptop computer, notebook computer, tablet computer, cellular phone, smart phone, smart watch, smart television, wearable computing device, implantable computing device, etc.

An electronic exam comprised of a plurality of questions, answers, and an answer key may be administered by an exam system 108. In some embodiments, the processing server 102 may operate as the exam system 108 and configured to perform the functions thereof as discussed herein. For administration of the examination, exam questions and potential answers for each exam question may be electronically transmitted to the computing device 106 using a suitable communication network and method. In some embodiments, the exam questions may only be made available to the computing device 106 at a predetermined period of time and/or when the user 104 or computing device 106 is authenticated, as discussed in more detail below.

The computing device 106 may display exam questions and potential answers to the user 104 via a display device interfaced therewith. Using an interfaced input device, the user 104 may select a potential answer for each exam question, which may then be submitted to the processing server 102. In some embodiments, each answer may be submitted as they are selected by the user 104 (e.g., for submission; in some cases the user 104 may be able to change their selected answer until they decide to submit the answer for scoring). In other embodiments, all of the answers may be submitted to the processing server 102 at the same time for scoring.

In the system 100, the user 104 (or computing device 106, as applicable) may have a blockchain wallet associated therewith that is unique to that user 104 (or computing device 106, as applicable). The blockchain wallet may be associated with a blockchain network 110 that is used to manage one or more blockchains. A blockchain wallet may be an application program that is executed by the computing device 106 associated with the user 104. A blockchain wallet may include a private key of a cryptographic key pair that is used to generate digital signatures that serve as authorization by the user 104 for a blockchain transaction or otherwise authenticate the user 104, where the digital signature can be verified by the blockchain network 110 and/or processing server 102 using the public key of the cryptographic key pair. In some cases, the term "blockchain wallet" may refer specifically to the private key.

The blockchain network 110 may be comprised of a plurality of nodes. Each node may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. In some embodiments, the processing server 102 may be a node in the blockchain network 110. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 110 prior to the generation and addition of a new block to the blockchain in order for the change to be made permanent. Computational and communication limitations may make such a modification exceedingly difficult, if not impossible, thus rendering the blockchain immutable.

Each blockchain data value may correspond to an exam answer submitted by the user 104. The computing device 106 may submit (e.g., as instructed by the user 104) an exam answer as well as the exam question or an indication related thereto (e.g., a question number) to the processing server 102 along with the digital signature generated using the user's blockchain wallet. The processing server 102 may validate the digital signature using a public key corresponding to the private key of the user's blockchain wallet. In some cases, when the user 104 registers to take the exam, the processing server 102 may generate the cryptographic key pair and provide the private key to the user 104 and retain the public key that is associated with the user 104 as part of the registration. In other cases, when the user 104 registers to take the exam, the user may submit the public key of their cryptographic key pair, which the processing server 102 may thereby associate with the user 104. When answers are submitted, the user 104 may (e.g., via the computing device 106) supply an identifier or other value used to identify the user 104 submitting the answers, which may be used by the processing server 102 to identify the appropriate public key.

Upon validation of the digital signature, the submitted answer may be scored by the processing server 102 based on the answer key provided by the exam system 108. The processing server 102 may generate a new blockchain data value that for the answer that is submitted to a node in the blockchain network 110 for validation and inclusion in a new block that is validated and added to the blockchain. In some embodiments, each blockchain wallet (e.g., user 104) may have its own blockchain associated therewith that answers are added to. In other embodiments, a single blockchain may store answers submitted by multiple users 104. In such embodiments, the identifier associated with the user may be included in the blockchain data value. In cases where multiple examinations may have scores stored on a single blockchain, further identifying information may be stored in the blockchain data value as applicable. For instance, if one blockchain stores answers for all exams administered in a school, a blockchain data value may include identifiers for the class, exam, and student in addition to the exam question and submitted answer.

In one embodiment, only correct answers may be submitted to the blockchain network 110 for addition to the blockchain. In such an embodiment, the user's score may be easily calculated by calculating the number of blockchain data values entered for the user 104 for a particular exam. In some such embodiments, incorrect answers may be stored in a separate blockchain or a sidechain, such as to provide additional transparency to the user 104 and auditors such that the user 104 will not be able to dispute their submitted answers. In other embodiments, each blockchain data value may include a flag indicating if the answer is correct or incorrect. In such embodiments, scoring of the exam for a user 104 may require identification of the flags in each of the blockchain data values stored in the blockchain for that exam for that user 104.

In some embodiments, each answer may be submitted to the processing server 102 separately by the computing device 106 and accompanied by a digital signature generated using the user's blockchain wallet. In other embodiments, all of the user's answers may be submitted to the processing server 102 in a single submission. In such embodiments, a single digital signature may be provided or the computing device 106 may generate a separate digital signature for each of the answers that are submitted. In the latter case, the processing server 102 may only evaluate answers where the accompanying digital signature is determined to be valid. In instances where a digital signature may be invalid, the user 104 may be instructed (e.g., through the computing device 106) to resubmit their answer and/or digital signature.

The storage of exam answers on a blockchain may provide for transparency as the blockchain may be made publicly viewable, but where the answers themselves are protected from tampering due to the immutability of the blockchain. In cases where answers from multiple users are stored on a blockchain, the transparency can be provided while maintaining user privacy if the identifier associated with a user 104 is not personally identifiable of that user 104. In addition, if an answer is added to the blockchain only upon successful validation of a digital signature, the blockchain may be made entirely public without restricting the computing systems that may operate as nodes in the blockchain network 110.

In some embodiments, exam questions may be stored on a blockchain. In some cases, the exam questions may be stored on the same blockchain as submitted answers. In other cases, the exam questions may be stored on a separate blockchain. In some instances, exam questions may be stored on a blockchain following administration of the exam, such as to prevent unauthorized access of the exam questions ahead of the examination. In other cases, exam questions may be stored on a blockchain and administered therefrom. In such cases, access to the blockchain or directly to the exam questions may be prevented until the exam is to be administered, such as through encryption or other methods for data access restriction. For instance, the exam questions may be stored in a private blockchain where they are not made available until a predetermined time when the exam it so be administered. In another example, when the user 104 registers for the exam and the processing server 102 generates the cryptographic key pair for the user 104, the processing server 102 may keep track of the exam that the user 104 registers for; when the user 104 wants to take the exam, they must supply their digital signature, which must be validated by the processing server 102 before the user 104 is provided with access to or directly provided the exam questions. In yet another example, the exam questions may be encrypted in such a manner that decrypted cannot be performed until a predetermined time. In some cases, the answer key may also be stored in the blockchain where access thereto is prevented until after the exam has been administered (e.g., to the particular user 104 or to all users taking the exam, as applicable).

In some embodiment, exam scores may also be stored in a blockchain. In some cases, the exam scores may be stored in the same blockchain as exam answers. In other cases, exam scores may be stored in a separate blockchain. In such cases, each exam score may be stored in a blockchain data value along with the user's identifier and an identifier associated with the exam to which it is related. The storage of scores directly in the blockchain may provide convenience to users 104, where the scores may be independently verifiable through the blockchain used to store the corresponding exam answers.

Processing Server

Figure 2:
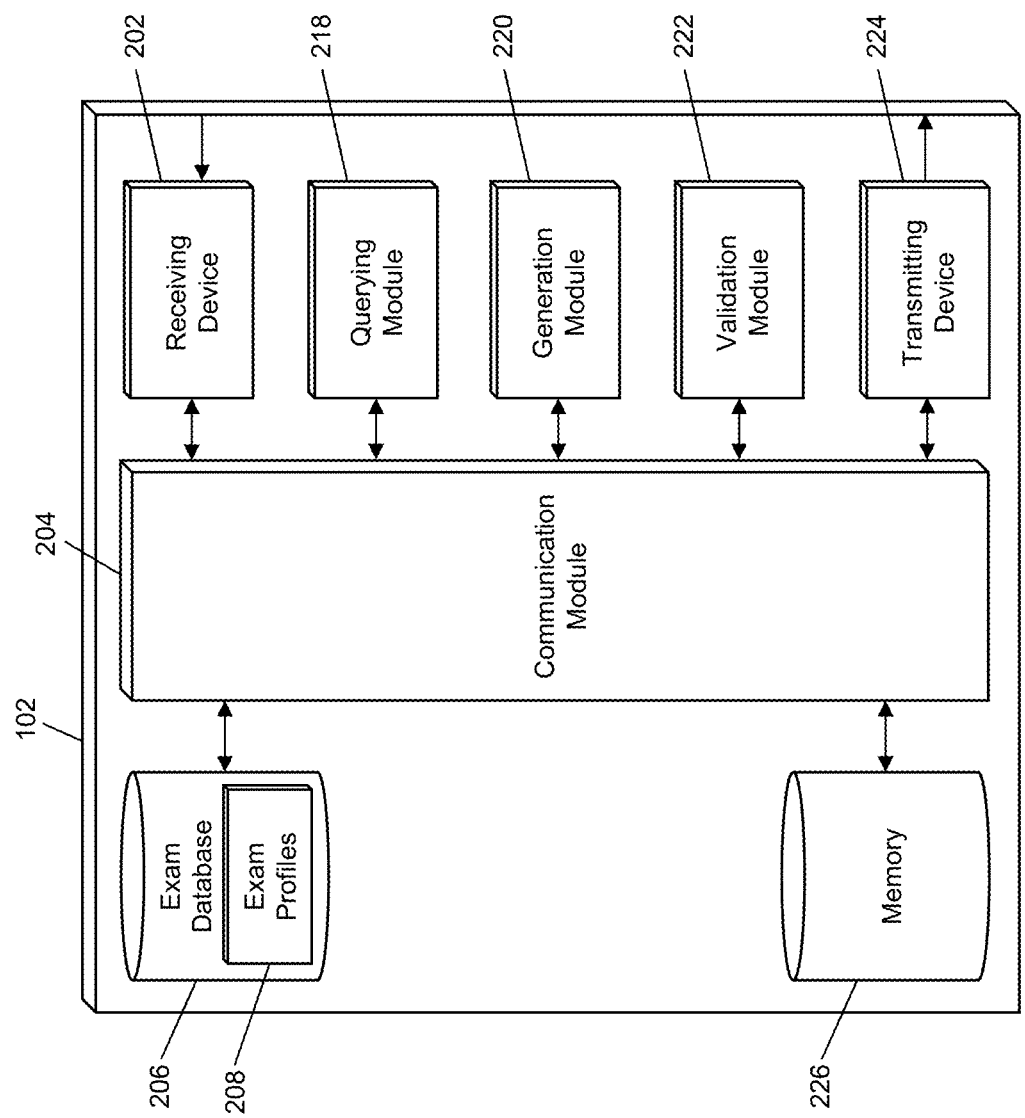
FIG. 2 is a block diagram illustrating the processing server of the system of FIG. 1 for scoring examinations using a blockchain in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from computing devices 106, exam systems 108, blockchain networks 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 106 that may be superimposed or otherwise encoded with exam registration data (e.g., including an exam identifier, user identifier, and, in some cases, a public key), exam question requests (e.g., including an exam identifier, user identifier, and digital signature), and exam answer submissions (e.g., including an exam identifier, user identifier, digital signature, exam question identifier, and submitted answer). The receiving device 202 may also be configured to receive data signals electronically transmitted by exam systems 108, which may be superimposed or otherwise encoded with exam questions, potential exam answers, and answer keys. The receiving device 202 may also be configured to receive data signals electronically transmitted by nodes in a blockchain network 110, which may be superimposed or otherwise encoded with blockchain data, including blockchain data values, confirmations of successful additions to the blockchain, etc.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, validation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include an exam database 206. The exam database 206 may be configured to store a plurality of exam profiles 208 using a suitable data storage format and schema. The exam database 206 may be a relational database that utilizes structured query language for the storage, identification, modifying, updating, accessing, etc. of structured data sets stored therein. Each exam profile 208 may be a structured data set configured to store data related to an exam. The exam profile 208 may include an identifier associated with the exam, a plurality of exam questions, potential answers for each exam question, and an answer key including the correct answers for each exam question. In some cases, an exam profile 208 may also store information regarding each user 104 registered to take the exam, such as the public key and user identifier for each user 104. In some instances, timing information regarding administration of the related exam may be stored in the exam profile 208.

The processing server 102 may include a querying module 218. The querying module 218 may be configured to execute queries on databases to identify information. The querying module 218 may receive one or more data values or query strings, and may execute a query string based thereon on an indicated database, such as the exam database 206, to identify information stored therein. The querying module 218 may then output the identified information to an appropriate engine or module of the processing server 102 as necessary. The querying module 218 may, for example, execute a query on the exam database 206 to identify an answer key for an exam for use in determining if answers submitted by a user 104 are correct or incorrect.

The processing server 102 may also include a generation module 220. The generation module 220 may be configured to generate data for use by the processing server 102 in performing the functions discussed herein. The generation module 220 may receive instructions as input, may generate data based on the instructions, and may output the generated data to one or more modules of the processing server 102. For example, the generation module 220 may be configured to generate cryptographic key pairs for distribution of private keys to user 104 for taking examinations, generate blockchain data values for received answer submissions, generate blockchain data values for received exam questions, potential answers, and answers keys, etc.

The processing server 102 may also include a validation module 222. The validation module 222 may be configured to validate data for the processing server 102 as part of the functions discussed herein. The validation module 222 may receive data to be validated as input, may attempt validation of the data, and may output a result of the attempted validation. In some cases, the validation module 222 may be provided with other data to be used in the validation. In other cases, the validation module 222 may be configured to identify (e.g., with the use of other modules and memory, such as the querying module 218 and exam database 206) other data to be used in the validation. The validation module 222 may be configured to, for example, validate digital signatures using public keys and appropriate signature generation algorithms.

The processing server 102 may also include a transmitting device 224. The transmitting device 224 may be configured to transmit data over one or more networks via one or more network protocols. In some instances, the transmitting device 224 may be configured to transmit data to computing devices 106, exam systems 108, blockchain networks 110, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to computing devices 106 that are superimposed or otherwise encoded with exam questions and potential answers, private keys for cryptographic key pairs, exam scores, or other data as discussed herein. The transmitting device 224 may also be configured to electronically transmit data signals to exam systems 108, which may be superimposed or otherwise encoded with requests for exam data, identified exam scores, etc. The transmitting device 224 may also be configured to electronically transmit data signals to nodes in a blockchain network 110 that are superimposed or otherwise encoded with blockchain data values for inclusion in a new block that is validated and added to the blockchain.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data, hashing algorithms for generating blocks, public keys, user identifiers, exam identifiers, exam data, etc.

Process for Examination Scoring

Figure 3:
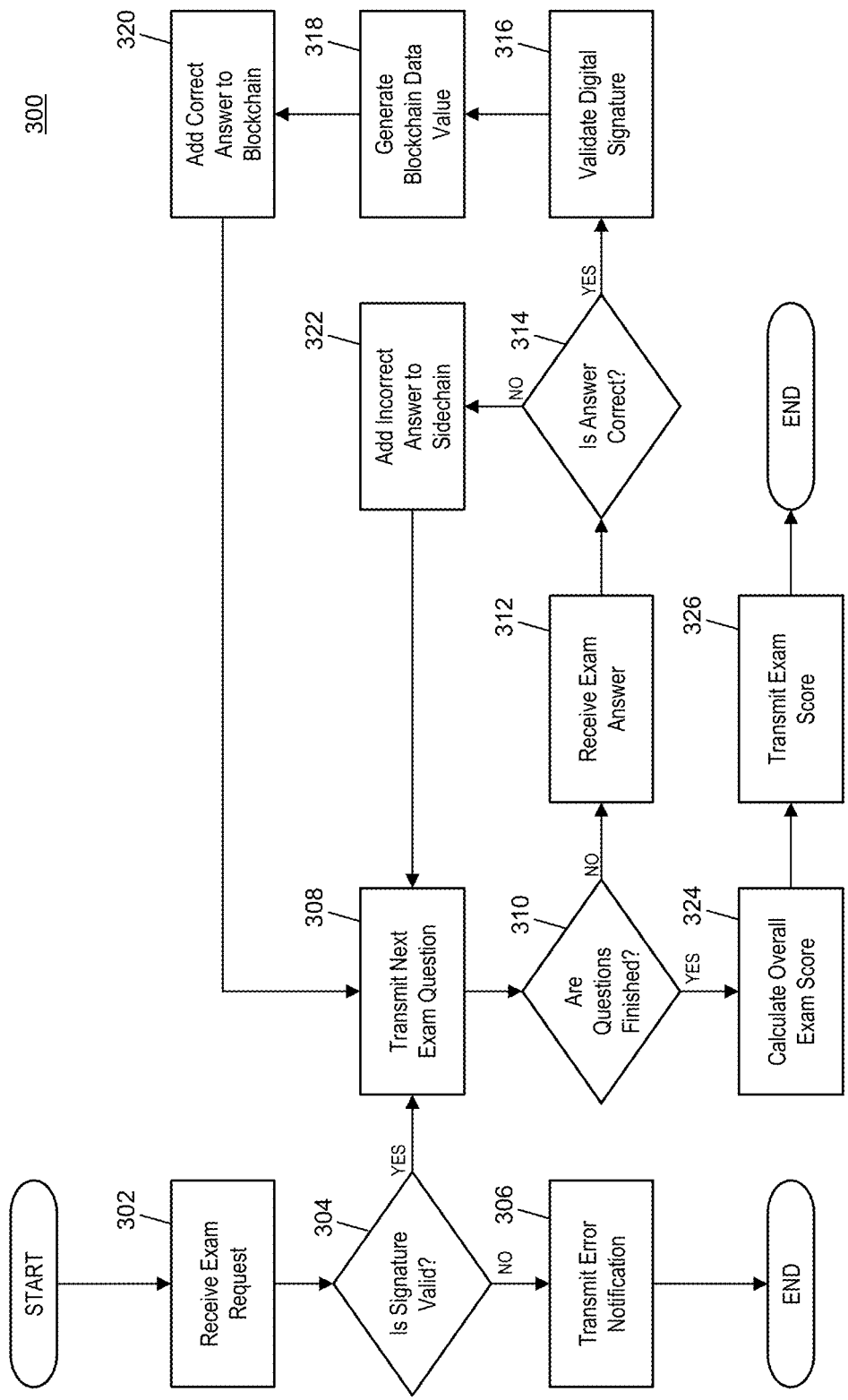
FIG. 3 is a flow diagram illustrating a process for the scoring of an examination via blockchain executed by the processing server of FIG. 2 in accordance with exemplary embodiments.

FIG. 3 illustrates an example process 300 for the scoring of an examination via use of a blockchain as executed by the processing server 102 of FIG. 2 in the system 100. In the process 300, the exam is administered to the user 104 one question at a time, with answers received accordingly. It will be apparent to persons having skill in the relevant art that the exam may be administered in other manners with the exam still being scored via the system 100 as discussed above.

In step 302, the receiving device 202 of the processing server 102 may receive an exam request from a computing device 106 as submitted by a user 104 requesting to take an examination. The exam request may include at least an exam identifier, user identifier, and a digital signature generated with a private key by the computing device 106. In step 304, the processing server 102 may determine if the digital signature provided in the exam request is valid. The determination may include the querying module 218 of the processing server 102 executing a query on the exam database 206 to identify an exam profile 208 for the exam using the exam identifier, identifying a public key in the exam profile 208 (e.g., or the memory 226, as applicable) that is associated with the user identifier, and the validation module 222 of the processing server 102 attempting to validate the digital signature using the identified public key.

If the validation is unsuccessful, then, in step 306, the transmitting device 224 of the processing server 102 may electronically transmit an error notification to the computing device 106 indicating that the digital signature is invalid. The user 104 may then be able to re-submit their request with a different digital signature, exam identifier, user identifier, etc. If the validation is successful, then, in step 308, the transmitting device 224 of the processing server 102 may electronically transmit the next exam question to be administered to the computing device 106 for answering by the user 104. In step 310, the processing server 102 may determine if the transmission was successful or if all of the questions have been administered.

If the transmission was successful (e.g., the exam questions are not finished), then, in step 312, the receiving device 202 may receive an exam answer submitted by the user 104 via the computing device 106 for the most recently transmitted question. In some cases, the answer may be accompanied by the exam identifier, a question identifier, user identifier, and a digital signature. In step 314, the validation module 222 of the processing server 102 may determine if the answer is correct, such as by reviewing the answer key in the exam profile 208 for the administered exam. If the answer is correct, then, in step 316, the digital signature may be validated by the validation module 222 of the processing server 102 using the public key associated with the user 104. In some embodiments, the validation may be performed prior to determining if the answer is correct. In some cases, the correct answer may not be honored if the digital signature is found to be invalid.

In step 318, the generation module 220 of the processing server 102 may generate a new blockchain data value for the correct answer, which may include at least the exam identifier, user identifier, and question identifier. In some cases, the blockchain data value may also include the correct answer or a flag that indicates that the question was answered correctly. In step 320, the transmitting device 224 of the processing server 102 may electronically transmit the new blockchain data value to a node in the blockchain network 110 for addition to the blockchain. The process 300 may then return to step 308 for administration of the next exam question. If, in step 314, the processing server 102 determined that the supplied answer was incorrect, then, in step 322, the incorrect answer may be added to a sidechain to the blockchain. The addition of the incorrect answer may include the generation of a new blockchain data value by the generation module 220 of the processing server 102 that includes the exam identifier, user identifier, question identifier, and incorrect answer, which may then be transmitted to a node in the blockchain network 110 by the transmitting device 224 of the processing server 102. Following addition of the incorrect answer, the process 300 may return to step 308 for administration of the next question for the exam.

Once, in step 310, it is determined that the exam has been finished, then, in step 324, the processing server 102 may calculate an overall exam score for the user 104. The score may be calculated by counting how many new blockchain data values were added to the blockchain for the user 104 for that exam, as each blockchain data value may correspond to a correct answer. In step 326, the transmitting device 224 of the processing server 102 may electronically transmit the user's exam score to the user 104 via the computing device 106. In some cases, the exam score may be transmitted to the exam system 108, which may provide the exam score to the user 104 via the computing device 106.

Exemplary Method for Examination Scoring via Blockchain

Figure 4:
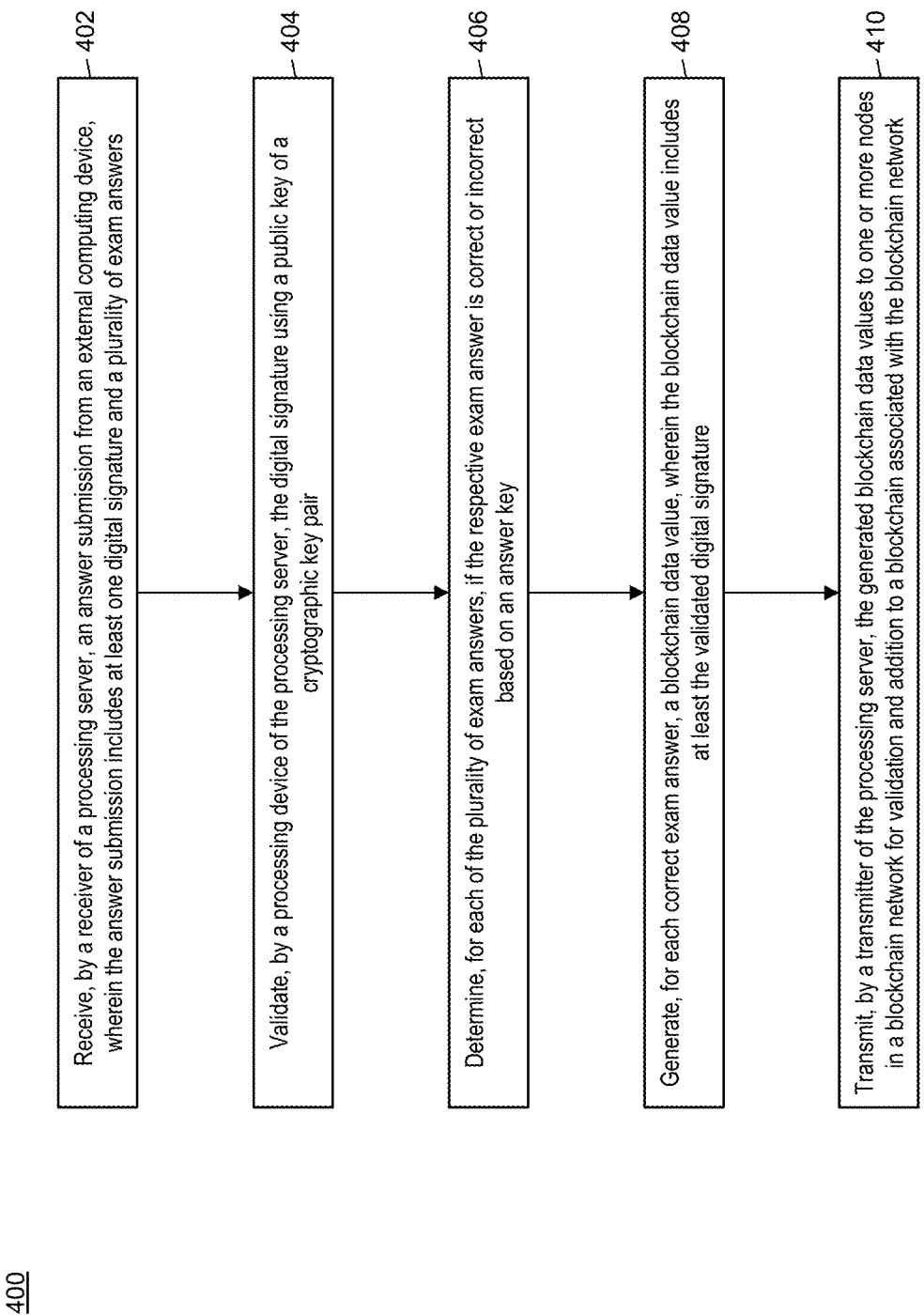
FIG. 4 is a flow chart illustrating an exemplary method for examination scoring via blockchain in accordance with exemplary embodiments.

FIG. 4 illustrates a method 400 for the scoring of an electronic examination via the use of a blockchain.

In step 402, an answer submission may be received by a receiver (e.g., the receiving device 202) of a processing server (e.g., the processing server 102) from an external computing device (e.g., the computing device 106), wherein the answer submission includes at least one digital signature and a plurality of exam answers. In step 404, the digital signature may be validated by a processing device (e.g., the validation module 222) of the processing server using a public key of a cryptographic key pair.

In step 406, the processing server may determine if the respective exam answer is correct or incorrect for each of the plurality of exam answers based on an answer key. In step 408, a blockchain data value may be generated for each correct exam answer, wherein the blockchain data value includes at least the validated digital signature. In step 410, the generated blockchain data values may be transmitted by a transmitter (e.g., the transmitting device 224) of the processing server to one or more nodes in a blockchain network (e.g., the blockchain network 110) for validation and addition to a blockchain associated with the blockchain network.

In one embodiment, a separate answer submission may be received for each exam answer of the plurality of exam answers. In some embodiments, the answer submission may include a separate digital signature for each exam answer of the plurality of exam answers, and validating the digital signature may include validating the digital signature for each exam answer of the plurality of exam answers.

In one embodiment, the method 400 may further include: generating, for each incorrect exam answer, a corresponding data value that includes at least the validated digital signature; and transmitting, by the transmitter of the processing server, the corresponding data value generated for each incorrect exam answer for addition to a separate blockchain. In some embodiments, the method 400 may also include: calculating, by the processing device of the processing server, an overall score based on at least a number of correct exam answers and a number of incorrect exam answers; generating, by the processing device of the processing server, an additional blockchain data value that includes at least the overall score and the digital signature; and transmitting, by the transmitter of the processing server, the generated additional blockchain value to one or more nodes in the blockchain network.

In one embodiment, the method 400 may further include identifying, by the processing device of the processing server, the answer key based on at least an identification value included in the received answer submission. In a further embodiment, the answer key may be stored in a separate blockchain. In some embodiments, the method 400 may also include: receiving, by the receiver of the processing server, an exam request, wherein the exam request includes an identification value and a unique data value that is subject to a time condition; and transmitting, by the transmitter of the processing server, a plurality of exam questions associated with the identification value if a present time satisfies the time condition, wherein each of the plurality of exam answers corresponds to one of the plurality of exam questions.

Computer System Architecture

Figure 5:
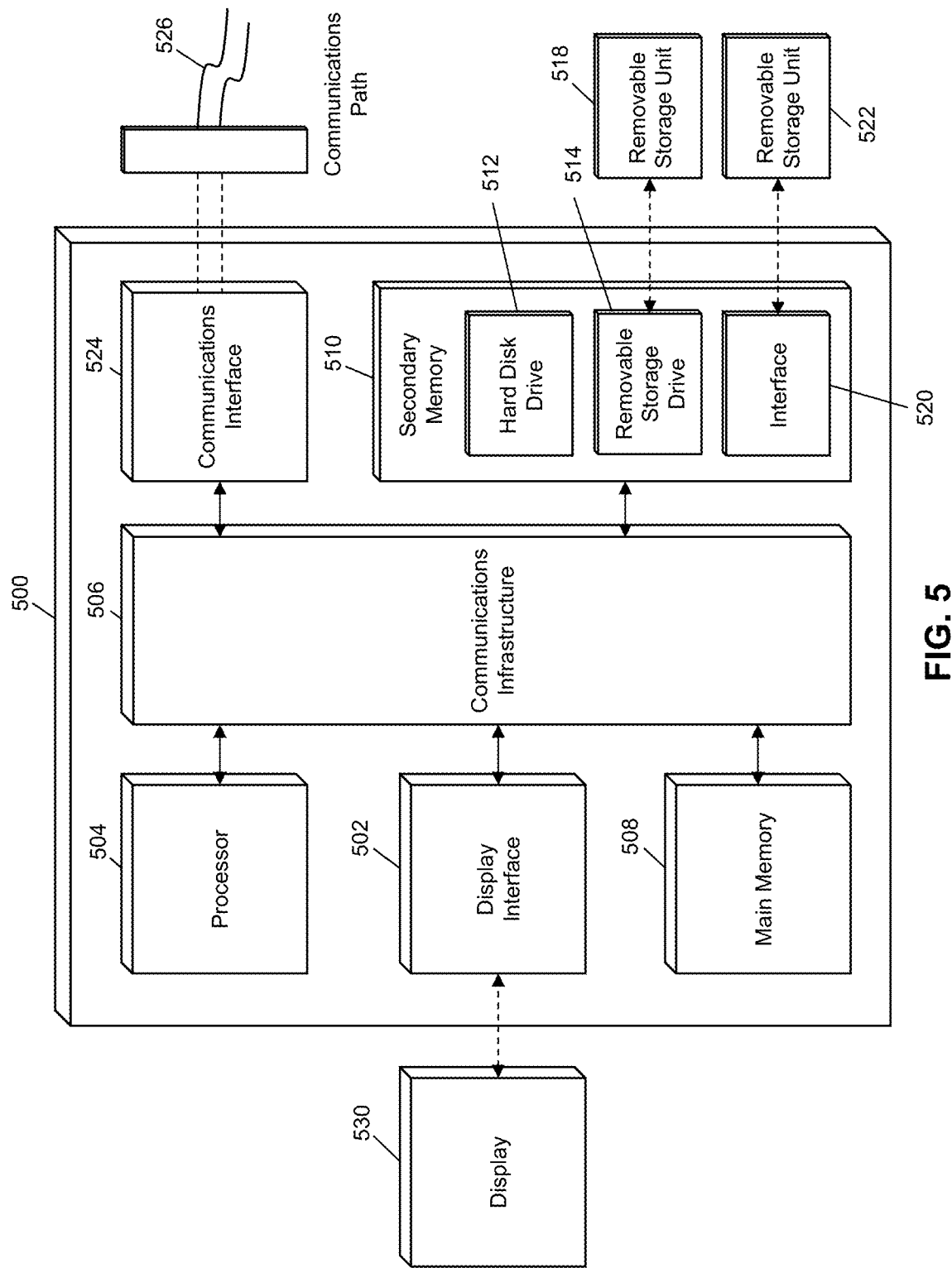
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for examination scoring via blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for examination scoring via blockchain, comprising:

receiving, by a receiver of a processing server, an answer submission from an external computing device, wherein the answer submission includes at least one digital signature, a plurality of exam answers, a separate digital signature for each exam answer of the plurality of exam answers;

validating, by a processing device of the processing server, the digital signature, using a public key of a cryptographic key pair, for each exam answer of the plurality of exam answers;

determining, for each of the plurality of exam answers, if the respective exam answer is correct or incorrect based on an answer key;

generating, for each correct exam answer, a blockchain data value, wherein the blockchain data value includes at least the validated digital signature;

transmitting, by a transmitter of the processing server, the generated blockchain data values to one or more nodes in a blockchain network for validation and addition to a blockchain associated with the blockchain network.

2. The method of claim 1, wherein a separate answer submission is received for each exam answer of the plurality of exam answers.

3. The method of claim 1, further comprising:

generating, for each incorrect exam answer, a corresponding data value that includes at least the validated digital signature; and transmitting, by the transmitter of the processing server, the corresponding data value generated for each incorrect exam answer for addition to a separate blockchain.

4. The method of claim 1, further comprising:

calculating, by the processing device of the processing server, an overall score based on at least a number of correct exam answers and a number of incorrect exam answers;

generating, by the processing device of the processing server, an additional blockchain data value that includes at least the overall score and the digital signature; and transmitting, by the transmitter of the processing server, the generated additional blockchain value to one or more nodes in the blockchain network.

5. The method of claim 1, further comprising:

identifying, by the processing device of the processing server, the answer key based on at least an identification value included in the received answer submission.

6. The method of claim 5, wherein the answer key is stored in a separate blockchain.

7. The method of claim 1, further comprising:

receiving, by the receiver of the processing server, an exam request, wherein the exam request includes an identification value and a unique data value that is subject to a time condition; and transmitting, by the transmitter of the processing server, a plurality of exam questions associated with the identification value if a present time satisfies the time condition, wherein each of the plurality of exam answers corresponds to one of the plurality of exam questions.

8. A system for examination scoring via blockchain, comprising:

a receiver of a processing server configured to receive an answer submission from an external computing device, wherein the answer submission includes at least one digital signature, a plurality of exam answers, and a separate digital signature for each exam answer of the plurality of exam answers;

a processing device of the processing server configured to validate the digital signature using a public key of a cryptographic key pair, for each answer of the plurality of exam answers, determine, for each of the plurality of exam answers, if the respective exam answer is correct or incorrect based on an answer key, and generate, for each correct exam answer, a blockchain data value, wherein the blockchain data value includes at least the validated digital signature; and a transmitter of the processing server configured to transmit the generated blockchain data values to one or more nodes in a blockchain network for validation and addition to a blockchain associated with the blockchain network.

9. The system of claim 8, wherein a separate answer submission is received for each exam answer of the plurality of exam answers.

10. The system of claim 8, wherein the processing device is further configured to generate, for each incorrect exam answer, a corresponding data value that includes at least the validated digital signature; and the transmitter of the processing server is further configured to transmit the corresponding data value generated for each incorrect exam answer for addition to a separate blockchain.

11. The system of claim 8, wherein the processing device of the processing server is further configured to calculate an overall score based on at least a number of correct exam answers and a number of incorrect exam answers, and generate an additional blockchain data value that includes at least the overall score and the digital signature, and the transmitter of the processing server is further configured to transmit the generated additional blockchain value to one or more nodes in the blockchain network.

12. The system of claim 8, wherein the processing device of the processing server is further configured to identify the answer key based on at least an identification value included in the received answer submission.

13. The system of claim 12, wherein the answer key is stored in a separate blockchain.

14. The system of claim 8, wherein the receiver of the processing server is further configured to receive an exam request, wherein the exam request includes an identification value and a unique data value that is subject to a time condition, the transmitter of the processing server is further configured to transmit a plurality of exam questions associated with the identification value if a present time satisfies the time condition, and each of the plurality of exam answers corresponds to one of the plurality of exam questions.

* * * * *